United States Patent
Sasano et al.

(10) Patent No.: US 6,908,981 B2
(45) Date of Patent: Jun. 21, 2005

(54) LAMINATE ADHESIVE

(75) Inventors: Shigetoshi Sasano, Osaka (JP); Sachio Igarashi, Osaka (JP)

(73) Assignee: Mitsui Takeda Chemicals, Inc., Tokyo (JP)

( * ) Notice: Subject to any disclaimer, the term of this patent is extended or adjusted under 35 U.S.C. 154(b) by 162 days.

(21) Appl. No.: 10/055,928

(22) Filed: Jan. 28, 2002

(65) Prior Publication Data

US 2002/0143102 A1 Oct. 3, 2002

(30) Foreign Application Priority Data

Jan. 29, 2001 (JP) ........................................ 2001-019652

(51) Int. Cl.$^7$ ........................ C09J 175/06; C08L 75/06; C08G 18/42
(52) U.S. Cl. ........................ 528/83; 528/74.5; 528/80; 528/905
(58) Field of Search .......................... 528/74.5, 80, 83, 528/905

(56) References Cited

U.S. PATENT DOCUMENTS

| | | | |
|---|---|---|---|
| 3,892,820 A | * 7/1975 | Goto et al. | 528/83 |
| 3,951,919 A | * 4/1976 | Pinfold et al. | 528/83 |
| 4,507,447 A | 3/1985 | Yamazaki et al. | 525/528 |
| 5,202,391 A | 4/1993 | Yamazaki et al. | 525/528 |
| 5,532,058 A | 7/1996 | Rolando et al. | 428/341 |
| 5,998,538 A | 12/1999 | Meckel et al. | 524/590 |
| 6,018,013 A | * 1/2000 | Yoshida et al. | 528/83 |
| 6,288,201 B1 | 9/2001 | Sasano et al. | 528/83 |

FOREIGN PATENT DOCUMENTS

| | | |
|---|---|---|
| EP | 0590398 A1 | 9/1993 |
| EP | 0 822 207 | 2/1998 |
| EP | 0643734 B1 | 7/1998 |
| FR | 2 746 403 | 9/1997 |
| WO | 93/24551 | 12/1993 |

OTHER PUBLICATIONS

Database WPI, Week 9013, Derwent Publications Ltd., London, GB; AN 1990–096955 XP002198591 & JP 02 050835 A, Feb. 20, 1990 * abstract *.
Database WPI, Week 8836, Derwent Publications Ltd., London, GB; AN 1988–252862 XP002198592 & JP 63 1822387 A, Jul. 27, 1988 * abstract *.

* cited by examiner

*Primary Examiner*—Rabon Sergent
(74) *Attorney, Agent, or Firm*—Wenderoth, Lind & Ponack, L.L.P.

(57) ABSTRACT

A laminate adhesive that can suppress elution of a low molecular weight compounds of a composite film into the content, so as to prevent the inherent properties or performances of the content from being spoiled by the low molecular weight compounds. In the laminate adhesive, the polyester polyol contains naphthalenedicarboxylic acid and/or alkyl ester thereof as an acid component, and concentration of cyclic ester compounds in extracted water, which are extracted from a composite film bonded by the laminate adhesive by water of 0.5 mL/cm$^2$ per unit area of the composite film, is 0.5 ppb or less in terms of dibutyl phthalate concentration measured by a gas chromatograph-flame ionization detector.

3 Claims, No Drawings

LAMINATE ADHESIVE

BACKGROUND OF THE INVENTION

1. Technical Field

The present invention relates to a laminate adhesive and, more particularly, to a laminate adhesive that is useful for the manufacture of packaging materials for use in a variety of industrial fields, including packaging materials for food products, beverages, medicinal products and quasi-drags, and packaging materials for electronic components such as hard disks.

2. Description of the Prior Art

Composite films produced by laminating a plastic film, a metal foil such as an aluminum foil, a metallized film, and a silica evaporated film by the application of an adhesive have been widely used as packaging materials for use in a variety of industrial fields including packaging materials for food products, beverages, medicinal products and quasi-drags, and packaging materials for electronic components such as hard disks, up to the present date.

A two component ester urethane adhesive, using polyisocyanate in combination with polyester polyol, has been used most as the laminate adhesive for use in manufacturing these packaging materials, because of its excellent adhesion properties.

It is known, on the other hand, that polyester polyol produces by-products of a cyclic ester compound in the manufacture of it, and it has been hitherto believed to be hard to avoid the production of such by-products.

Industrially, when polyester polyol is produced in such a manner that polyester oligomer is synthesized by esterification reaction between polybasic acid and polyhydric alcohol or by ester exchange reaction between alkyl ester of polybasic acid and polyhydric alcohol, first, and then the polyester oligomer thus synthesized is subjected to condensation reaction, the number average molecular weight can be freely adjusted. However, in this technique, the ethylene glycol and propylene glycol that can be removed in reduced pressure must be used as the polyhydric alcohol. On the other hand, the polyester polyol used in the laminate adhesive uses an aromatic acid (usually a phthalic acid) as the polybasic acid, in order to provide the heat resistance to the laminate adhesive. However, the production of such a polyester polyol including the phthalic acid and ethylene glycol and/or propylene glycol inevitably produces the cyclic ester compound of the phthalic acid and the ethylene glycol and/or propylene glycol.

In recent years, there have advanced the studies on the substance that is eluted from packaging material into a content, which suggests the possibility that some low molecular weight compounds may be eluted from the adhesive into the content and the low molecular weight compounds thus eluted may attribute the cause, in part, to spoil the inherent properties of the content, such as the odor and taste of food products and beverages, or the inherent performances of the electronic components, though the cause and effect relationship has not yet been clarified.

It is the object of the present invention to provide a laminate adhesive that can suppress elution of a low molecular weight compounds of composite film into the content, so as to prevent the inherent properties or performances of the content from being spoiled by the low molecular weight compounds.

SUMMARY OF THE INVENTION

The present invention provides a novel laminate adhesive comprising a polyisocyanate component and a polyol component containing polyester polyol, wherein the polyester polyol contains naphthalenedicarboxylic acid and/or alkyl ester thereof as an acid component; and wherein concentration of cyclic ester compounds in extracted water, which are extracted from a composite film bonded by the laminate adhesive by water of 0.5 mL/cm$^2$ per unit area of the composite film, is 0.5 ppb or less in terms of dibutyl phthalate concentration measured by a gas chromatograph-flame ionization detector.

In the laminate adhesive of the present invention, it is preferable that the polyester polyol further contains ethylene glycol and/or propylene glycol as a polyhydric alcohol component. It is also preferable that the polyester polyol further contains a dimer acid as an acid component.

Further, in the laminate adhesive of the present invention, concentration of cyclic urethane compounds in extracted water, which are extracted from a composite film bonded by the laminate adhesive by water of 0.5 mL/cm$^2$ per unit area of the composite film, is 0.5 ppb or less in terms of dibutyl phthalate concentration measured with a gas chromatograph-flame ionization detector.

According to the laminate adhesive of the present invention, since the concentration of the cyclic ester compounds in extracted water, which are extracted from a composite film bonded by the laminate adhesive by water of 0.5 mL/cm$^2$ per unit area of the composite film, is 0.5 ppb or less in terms of dibutyl phthalate concentration measured with a gas chromatograph-flame ionization detector, the elution of the cyclic ester compounds of the composite film into the content originating from the adhesive is significantly reduced, as compared with the conventional ester based urethane adhesives. Hence, when a food product or beverage is packed in the film, the inherent properties, such as the odor and taste, of the food product or beverage can be prevented from being spoiled. Also, when an electronic component, such as a hard disc, which is subjected to loss by even an extremely small amount of inclusion, is packed in the film, the inherent performances of the electronic component can be prevented from being spoiled. Thus, the laminate adhesive of the present invention can be suitably used as the laminate adhesive for use in the manufacture of packaging materials for a variety of industrial products including those products.

DESCRIPTION OF THE PREFERRED EMBODIMENTS

The laminate adhesive of the present invention comprises a polyisocyanate component and a polyol component.

Polyisocyanates commonly used in the manufacture of polyurethane may be used as the polyisocyanate component of the invention. Examples of the polyisocyanate component include polyisocyanate monomers and derivatives thereof.

The polyisocyanate monomers which may be used include, for example, aliphatic diisocyanate such as hexamethylene diisocyanate, alicyclic diisocyanate such as 3-isocyanatomethyl-3,5,5-trimethylcyclohexyl isocyanate, dicyclohexylmethane-4,4'-diisocyanate, 1,3- or 1-4-bis (isocyanatomethyl) cyclohexane or mixtures thereof, aralkyl diisocyanate such as 1,3- or 1-4-xylylene diisocyanate or mixtures thereof, 1,3- or 1-4-bis(1-isocyanato-1-methyl ethyl)benzene or mixtures thereof, and aromatic diisocyanate such as 2,4- or 2,6-tolylenediisocyanate or mixtures thereof, and diphenylmethane diisocyanate.

The derivatives of the polyisocyanate monomers which may be used include, for example, dimers or trimers of polyisocyanate monomers, biurets, allophanates and oxadiazinetriones obtained by reaction of the polyisocyanate monomers with water, polyhydric alcohol, carbon dioxide gas and so on. Two or more of these monomers and derivatives thereof may be used in combination.

Preferably, the derivatives of polyisocyanate monomers are used. Particularly preferable are those having unreacted monomers content of 1% or less.

The polyol component contains polyester polyol in its component, and the polyester polyol contains naphthalenedicarboxylic acid and/or alkyl ester thereof as an acid component.

The polyester polyol can be produced, for example, in such a manner that polyester oligomer is synthesized by esterification reaction between polybasic acid and polyhydric alcohol or by ester exchange reaction between alkyl ester of polybasic acid and polyhydric alcohol, first, and then the polyester oligomer thus synthesized is subjected to condensation reaction. When the polyester polyol is produced by the condensation reaction of the polyester oligomer in this manner, the number average molecular weight can be freely adjusted, thus facilitating the molecular design.

The polyester polyol may be obtained in the form of polyester polyurethane polyol by subjecting the polyester oligomer obtained in the manner as described above to the urethane reaction with the polyisocyanate monomer described above under known conditions.

The naphthalenedicarboxylic acid and/or alkyl ester thereof, such as 2,6-naphthalenedicarboxylic acid and/or alkyl ester thereof, are used as indispensable component of the polybasic acid and/or the alkyl ester thereof. In addition, dimer acid, and phthalic acid (orthophthalic acid, isophthalic acid and terephthalic acid) and/or alkyl ester thereof are used under prescription. Two or more of the polybasic acids and/or the alkyl esters thereof may be used in combination.

Alkyl ester having 1–4 carbons, preferably, methyl ester of polybasic acid or ethyl ester of polybasic acid, is used as the alkyl ester of polybasic acid. The dimer acid comprises, in general, a dimer of unsaturated aliphatic acid having 18 carbons as its major component which is available as industrial material and additionally includes a monomer acid or a trimer acid.

The polyhydric alcohols which may preferably be used include glycols, such as ethylene glycol, diethylene glycol, propylene glycol, 1,3-butanediol, 1,4-butanediol, 2-methyl-1,3-propanediol, neopentyl glycol, 1,6-hexandiol, 1,7-heptanediol, 1,9-nonane diol, cyclohexane dimethanol, 3-methyl-1,5-pentanediol, 3,3'-dimethylolheptane, and 2-methyl-1,8-octanediol, triols, such as glycerine and trimethylolpropane, and dimethylol alkane acids, such as dimethylol propionic acid and dimethylol butanoic acid. Two or more of the polyhydric alcohols may be used in combination.

According to the present invention, the naphthalenedicarboxylic acid and/or alkyl ester thereof are used as indispensable component of the polybasic acid and/or the alkyl ester thereof. When the naphthalenedicarboxylic acid and/or alkyl ester thereof are used, cyclic ester compounds of naphthalenedicarboxylic acid and glycol, which is produced by the reaction between naphthalenedicarboxylic acid and glycol, is not eluted through the film, so that the inherent properties of the packaged contents are maintained in good condition. Besides, the use of naphthalenedicarboxylic acid as a substitute for phthalic acid can provide heat resistance for the laminate adhesive.

In the conventional method, the polyester oligomer is synthesized by using the phthalic acid used to provide heat resistance to the adhesive and the glycol that can be removed in reduced pressure, such as ethylene glycol and propylene glycol, and then the polyester oligomer thus synthesized is subjected to condensation reaction, whereby the polyester polyol is industrially produced while the number average molecular weight is adjusted. In this conventional method of producing the polyester polyol, the cyclic ester compound of phthalic acid and glycol is inevitably produced. In contrast to this, when the naphthalenedicarboxylic acid and/or alkyl ester thereof is used in combination of the glycol that can be removed in reduced pressure, irrespective of the kinds of glycols, the polyester polyol can be produced by the condensation reaction, while the number average molecular weight is adjusted. Besides, even when the cyclic ester compound of naphthalenedicarboxylic acid and glycol is additionally produced, such by-product of cyclic ester compound is effectively prevented from being eluted through the film.

In the present invention, the dimer acid may further be used as the polybasic acid. Even when the dimer acid is used, the cyclic ester compounds of dimer acid and glycol, which is produced by the reaction between the dimer acid and the glycol, is prevented from being eluted through the film, as in the case where the naphthalenedicarboxylic acid is used, so that the inherent properties of the packaged contents are maintained in good condition.

Further, in the present invention, when the glycol including no ether linkage in the principal chain and having 6–7 carbons in the principal chain, of the glycols, is used, to be more specific, when 1,6-hexandiol is used, the phthalic acid, or preferably isophthalic acid, may be used as the polybasic acid. The cyclic ester compound of two molecules of isophthalic acid and two molecules of 1,6-hexandiol, which is produced by the reaction between the isophthalic acid and the 1,6-hexandiol, is hard to elute through the film, so that the inherent properties of the packaged contents are maintained in good condition. It is to be noted that the principal chain of glycol means a molecular chain sandwiched between two hydroxyl groups, and the carbon number of the principal chain indicates the number of carbons in the molecular chain.

For example, when the isophthalic acid is allowed to react with the glycol having the carbon number of the principal chain of 5 or less, there may be a case where a cyclic ester compound of two molecules of the isophthalic acid and two molecules of the glycol is produced, so that the cyclic ester compound produced is eluted through the film. Also, when the isophthalic acid is allowed to react with the glycol having the carbon number of the principal chain of 8 or more, there may be a case where a cyclic ester compound of one molecule of the isophthalic acid and one molecule of the glycol is produced, so that the cyclic ester compound produced is eluted through the film.

For this reason, according to the present invention, the polyester polyol can industrially be produced, for example, in such a manner that polyester oligomer is synthesized by ester exchange reaction between alkyl ester of naphthalenedicarboxylic acid (preferably, alkyl ester of 2-6-naphthalenedicarboxylic acid) and the glycol including the glycol that can be removed in reduced pressure (preferably, ethylene glycol and/or propylene glycol), first, and then the polyester oligomer thus synthesized is subjected to esterification reaction by blending a dimer acid, if necessary, and then to the condensation reaction.

Alternatively, the polyester polyol can be produced, for example, in such a manner that polyester oligomer is synthesized by esterification reaction between naphthalenedicarboxylic acid (preferably, 2–6-naphthalenedicarboxylic acid), dimer acid, if necessary, and glycol including the glycol that can be removed in reduced pressure (preferably, ethylene glycol and/or propylene glycol), first, and then the polyester oligomer thus synthesized is subjected to esterification reaction by blending a dimer acid, if necessary, and then to the condensation reaction.

In the present invention, the polyester polyol may be obtained in the form of polyester polyurethane polyol in such a manner that after synthesized, the polyester oligomer is subjected to the urethane reaction with the polyisocyanate monomer under known conditions.

In this case, there is no need to industrially use the glycol that can be removed in reduced pressure. Hence, the polyester polyol can then be produced, for example, in such a manner that polyester oligomer is synthesized by esterification reaction between naphthalenedicarboxylic acid (preferably, 2–6-naphthalenedicarboxylic acid), dimer acid and phthalic acid (preferably, isophthalic acid), if necessary, and 1,6-hexanediol, first, and then the polyester oligomer thus synthesized is subjected to urethane reaction.

When the polyester polyol is obtained in the form of polyester polyurethane polyol, it is preferable that an unreacted glycol in the polyester oligomer used for urethane modification is not more than 0.1 weight %. With the unreacted glycol in the polyester oligomer in excess of 0.1 weight %, when the polyester oligomer and polyisocyanate monomer are allowed to react with each other, there is the possibility that the polyisocyanate monomer may react with the unreacted glycol to thereby produce cyclic urethane components, depending on the groups of polyisocyanate monomer, and the cyclic urethane components may be eluted through the film. The content of the unreacted glycol in the polyester oligomer can be measured by gas chromatography (flame ionization detector), for example. To set the unreacted glycol in the polyester oligomer at 0.1 weight % or less, the unreacted glycol may be removed in a known manner, such as, for example, removing the unreacted glycol in reduced pressure.

Although a preferable polyisocyanate monomer may be properly selected as the polyisocyanate monomer that is to be allowed to react with the polyester oligomer, dicyclohexylmethane-4,4'-diisocyanate and/or diphenylmethane diisocyanete are/is preferably used. The dicyclohexylmethane-4,4'-diisocyanate and/or the diphenylmethane diisocyanete have/has the tendency of being resistant to producing cyclic urethane compounds with glycol. Consequently, there is no need to consider the content of unreacted glycol in the polyester polyol.

The polyester polyurethane polyol may be produced by the urethane reaction of the polyhydric alcohol described above with the polyisocyanate monomer described above, together with the polyester oligomer.

Accordingly, it is preferable that the polyester polyol of the present invention thus produced comprises as a unit structure a reaction product of naphthalenedicarboxylic acid and/or alkyl ester thereof (preferably, 2,6-naphthalenedicarboxylic acid and/or alkyl ester thereof) with glycol (preferably, glycol including ethylene glycol and/or propylene glycol), a reaction product of dimer acid with glycol (preferably, glycol including ethylene glycol and/or propylene glycol), if necessary, and a reaction product of phthalic acid (preferably, isophthalic acid) with 1,6-hexandiol, if necessary.

The polyester polyol thus produced has preferably the number average molecular weight of about 3,000 to about 100,000, further preferably about 5,000 to about 20,000.

The polyester oligomer itself may be used directly as the polyester polyol of the present invention. Preferably, such polyester oligomer has the number average molecular weight of e.g. 500 to less than 3,000.

The laminate adhesive of the present invention can be obtained by formulating the polyisocyanate component and polyol component described above. The ratio for the polyisocyanate component and the polyol component to be blended is in the range of between not less than 0.4 and not more than 10.0, preferably between not less than 0.5 and not more than 5.0, in the equivalent ratio (NCO/OH) of an isocyanate group of the polyisocyanate component to a hydroxyl group of the polyol component.

Further, additives intended for the improvement of adhesion properties, such as a silane coupling agent, an oxy acid of phosphorous or derivative thereof, and a known catalytic agent for adjusting the curing reaction may be blended in the laminate adhesion of the present invention within the range that the performance of the laminate adhesion of the present invention is not inhibited.

The laminate adhesive of the present invention thus produced is mainly used as the adhesives for use in the manufacture of a composite film by lamination of films. The lamination of the composite film can be performed by the following two methods, for example. One is that the polyisocyanate component and the polyol component are diluted with organic solvent and then blended, for preparation of the laminate adhesive of the present invention and, thereafter, the adhesive thus prepared is applied to surfaces of the respective films by use of a solvent type lamninator. After the solvent is vaporized, the adhering surfaces of the films are adhesive bonded and then cured under room temperature or warmed temperature for the curing. Another is that in the case where the blending viscosity of polyisocyanate component and polyol component is about 100 to about 10,000 mPa·s, or preferably about 100 to about 5,000 mPa·s, in the temperature range of from room temperature to 100° C., e.g. the polyisocyanate component and the polyol component are blended as they are, for preparation of the laminate adhesive of the present invention and, thereafter, the adhesive thus prepared is applied to the surfaces of the respective films by use of a solvent-free type laminator to adhesive bond the surfaces of the films. Then, the surfaces are cured under room temperature or warmed temperature for the curing of the adhesive. It is preferable that the spread of the adhesive of the solvent type is usually in the range of about 2.0 to about 5.0 g/m$^2$ after evaporation of the solvent, and the spread of the adhesive of the solvent-free type is usually in the range of about 1.0 to about 3.0 g/m$^2$.

Examples of the films to be laminated include plastic films of e.g. polyethylene terephthalate, nylon, polyethylene, polypropylene and polyvinyl chloride, metal foils of e.g. aluminum, metallized films, silica evaporated films, and metallic films of e.g. stainless steel, iron, copper and lead. Take the plastic films for instance, they preferably have thickness of 5–200 μm.

The laminate adhesive of the present invention is so made that concentration of cyclic ester compounds in extracted water, which are extracted from the thus laminated composite film by water of 0.5 mL/cm$^2$ per unit area of the composite film, can be 0.5 ppb or less in terms of dibutyl phthalate concentration measured by the gas chromatograph-flame ionization detector. With the 0.5 ppb or less concentration, the elution of the cyclic ester compounds of the composite film into the content originating from the adhesive is extremely reduced, as compared with the conventional ester based urethane adhesives.

Preferably, the laminate adhesive of the present invention is so made that concentration of cyclic urethane compounds in extracted water, which are extracted from the thus laminated composite film by water of 0.5 mL/cm$^2$ per unit area of the composite film, can be 0.5 ppb or less in terms of dibutyl phthalate concentration measured by the gas chromatograph-flame ionization detector. With the 0.5 ppb or less concentration, the elution of the cyclic urethane compounds of the composite film into the content originating from the adhesive is extremely reduced, as compared with the conventional ester based urethane adhesives.

The concentration of the cyclic ester compounds and the cyclic urethane compounds can be determined by the following method, for example. A bag is made from the composite film produced by lamination of films in the manner described above, and then ion-exchange distilled water as the content is filled in the bag by the amount of 0.5 mL/cm$^2$ per unit area of the composite film. After the bag is sterilized by heated water under pressure, the contained water is extracted by any selected known method such as a liquid-solid extraction or a liquid-liquid extraction for recovering substantially all cyclic ester compounds and cyclic urethane compounds. Then, samples are drawn from the extracts and are measured by the gas chromatography (flame ionization detector).

The quantity can be determined as a value to be converted to dibutyl phthalate concentration measured by the flame ionization detector of the gas chromatography, using dibutyl phthalate as reference substance. For example, if the concentration of the cyclic ester compounds and cyclic urethane compounds of 0.5 ppb or less in terms of dibutyl phthalate concentration can be determined depending upon whether the cyclic ester compounds and the cyclic urethane compounds are detected or not, then the detection limit of the concentration of the cyclic ester compounds and the cyclic urethane compounds in the extracted water can be supposed to be 0.5 ppb in terms of dibutyl phthalate concentration.

According to the laminate adhesive of the present invention, since the concentration of the cyclic ester compounds thus measured is 0.5 ppb or less, the elution of the cyclic ester compounds of the composite film into the content originating from the adhesive is significantly reduced, as compared with the conventional ester based urethane adhesives. Hence, when a food product or beverage is packed in the film, the inherent properties, such as the odor and taste, of the food product or beverage can be prevented from being spoiled. Also, when an electronic component such as a hard disc which is subjected to loss by even an extremely small amount of inclusion, is packed in the film, the inherent performances of the electronic component can be prevented from being spoiled. Thus, the laminate adhesive of the present invention can be suitably used as the laminate adhesive for use in the manufacture of packaging materials for a variety of industrial products including those products.

EXAMPLES

While the present invention will be described in further detail with reference to the following examples, the present invention is not limited to those examples. The terms, "parts" and "%", presented in the examples and the comparative examples are all on a weight basis, unless otherwise specified therein.

Producing Example 1
(Production of Polyol Component A)

389.8 g of dimethyl-2,6-naphthalenedicarboxylate, 67.0 g of propylene glycol, 156.0 g of 3-methyl-1,5-pentanediol, and 0.1 g of titanium tetrabutoxide were added, respectively, and were subjected to ester exchange reaction at 180–220° C. in a stream of nitrogen. After a prescribed amount of methanol was distilled, the system was gradually depressurized, so that the reaction product was condensed at 220° C. for 4 hours under pressure of 13.3 Pa or less, to obtain polyester polyol having the number average molecular weight of about 6,000. The total amount of the polyester polyol thus obtained was dissolved in 467.9 g of methyl ethyl ketone, so that polyol component A formed in solution having a solid content of 50% was obtained.

Producing Example 2
(Production of Polyol Component B)

123.9 g of dimethyl-2,6-naphthalenedicarboxylate, 60.5 g of propylene glycol, 82.8 g of neopentyl glycol, and 0.1 g of titanium tetrabutoxide were added, respectively, and were subjected to ester exchange reaction at 180–220° C. in a stream of nitrogen. After a prescribed amount of methanol was distilled, 290.4 g of dimer acid was added, for esterification reaction at 180–220° C. After a prescribed amount of water was distilled, the system was gradually depressurized, so that the reaction product was condensed at 220° C. for 3 hours under pressure of 13.3 Pa or less, to obtain polyester polyol having the number average molecular weight of about 6,000. The total amount of the polyester polyol thus obtained was dissolved in 467.9 g of methyl ethyl ketone, so that polyol component B formed in solution having a solid content of 50% was obtained.

Producing Example 3
(Production of Polyol Component C)

123.9 g of dimethyl-2,6-naphthalenedicarboxylate, 32.9 g of ethylene glycol, 110.4 g of neopentyl glycol, and 0.1 g of zinc acetate were added, respectively, and were subjected to ester exchange reaction at 180–220° C. in a stream of nitrogen. After a prescribed amount of methanol was distilled, 290.3 g of dimer acid was added, for esterification reaction at 180–220° C. After a prescribed amount of water was distilled, the system was gradually depressurized, so that the reaction product was condensed at 220° C. for 4 hours under pressure of 13.3 Pa or less, to obtain polyester polyol having the number average molecular weight of about 8,000. The total amount of the polyester polyol thus obtained was dissolved in 464.6 g of methyl ethyl ketone, so that polyol component C formed in solution having a solid content of 50% was obtained.

Producing Example 4
(Production of Polyol Component D)

377.0 g of dimethyl terephthalate, 78.0 g of propylene glycol, 181.7 g of 3-methyl-1,5-pentandiol, and 0.1 g of titanium tetrabutoxide were added, respectively, and were subjected to ester exchange reaction at 180–220° C. in a stream of nitrogen. After a prescribed amount of methanol was distilled, the system was gradually depressurized, so that the reaction product was condensed at 220° C. for 4 hours under pressure of 13.3 Pa or less, to obtain polyester polyol having the number average molecular weight of about 6,000. The total amount of the polyester polyol thus obtained was dissolved in 467.9 g of methyl ethyl ketone, so that polyol component D formed in solution having a solid content of 50% was obtained.

Producing Example 5
(Production of Polyol Component E)

141.6 g of isophthalic acid, 38.6 g of ethylene glycol, 129.7 g of neopentyl glycol, and 0.1g of zinc acetate were added, respectively, and were subjected to esterification reaction at 180–220° C. in a stream of nitrogen. After a prescribed amount of water was distilled, 244.0 g of dimer acid was added, for esterification reaction at 180–220° C. After a prescribed amount of water was distilled, the system was gradually depressurized, so that the reaction product was condensed at 220° C. for 4 hours under pressure of 13.3 Pa or less, to obtain polyester polyol having the number average molecular weight of about 8,000. The total amount of the polyester polyol thus obtained was dissolved in 464.6 g of methyl ethyl ketone, so that polyol component E formed in solution having a solid content of 50% was obtained.

Producing Example 6
(Production of Polyol Component F)

123.9 g of dimethyl-2,6-naphthalenedicarboxylate, 60.5 g of propylene glycol, 82.8 g of neopentyl glycol, and 0.1 g of zinc acetate were added, respectively, and were subjected to ester exchange reaction at 180–220° C. in a stream of nitrogen. After a prescribed amount of methanol was distilled, 290.4 g of dimer acid was added, for esterification reaction at 180–220° C. After a prescribed amount of water was distilled, polyester polyol having the number average molecular weight of about 1,000 was obtained as polyol component F.

Producing Example 7
(Production of Polyol Component G)

After 500 g of polyol F was dissolved in 214.3 g of methyl ethyl ketone, 100.1 g of diphenylmethane diisocyanate was further added thereto, for urethane reaction at 75° C. in a stream of nitrogen. After the reaction, 385.8 g of methyl ethyl ketone was added to the reaction product, so that polyol component G formed in solution having a solid content of 50% was obtained.

Producing Example 8
(Production of Polyol Component H)

104.8 g of dicyclohexylmethane-4,4'-diisocyanate was added to 500 g of polyol F, for urethane reaction at 110° C. in a stream of nitrogen. After the reaction, 604.8 g of methyl ethyl ketone was added to the reaction product, so that polyol component H formed in solution having a solid content of 50% was obtained.

Producing Example 9
(Production of Polyol Component I)

128.0 g of dimethyl-2,6-naphthalenedicarboxylate, 30.2 g of ethylene glycol, 49.4 g of propylene glycol, 50.8 g of neopentyl glycol, and 0.05 g of titanium tetrabutoxide were added, respectively, and were subjected to ester exchange reaction at 180–220° C. in a stream of nitrogen. After a prescribed amount of methanol was distilled, 300.0 g of dimer acid was added, for esterification reaction at 180–220° C. After a prescribed amount of water was distilled, the system was gradually depressurized, so that the reaction product was condensed at 220° C. for 3 hours under pressure of 13.3 Pa or less, to obtain polyester polyol having the number average molecular weight of about 8,000. The total amount of the polyester polyol thus obtained was dissolved in 464.6 g of ethyl acetate, so that polyol component I formed in solution having a solid content of 50% was obtained.

Producing Example 10
(Production of Polyisocyanate Component A)

70 g of trimer of 3-isocyanatomethyl-3,5,5-trimethylcyclohexyl isocyanate having an isocyanate group content of 17.3% (VESTANATE T1890/100 available from Huls Corporation) was dissolved in 30 g of ethyl acetate, to obtain polyisocyanate component A formed in solution having a solid content of 70%.

Producing Example 11
(Production of Polyisocyanate Component B)

A mixed solution of 100 g of hexamethylene diisocyanate and 0.01 g of trimethyl benzylammonium hydroxide was subjected to trimerization reaction at 60° C. for 1 hour. Subsequently, unreacted monomers were removed at 120° C. at 13.3 Pa to produce polyisocyanate component B comprising 35 g of a hexamethylene diisocyanate trimer. It was found that the polyisocyanate B thus produced was of a 100% solid content, a 0.1% unreacted monomer content, a 21% isocyanate group content and a 2,000 mPa·s viscosity at 25° C.

Preparation of and Evaluation of Examples and Comparative Examples

The polyols A–I and the polyisocyanates A and B thus obtained were blended as cited in TABLE 1 to prepare the laminate adhesives of Examples 1–7 and Comparative Examples 1–2. Subsequently, the composite films were produced in the method as will be mentioned later using the obtained laminate adhesives of the respective Examples and Comparative Examples. Thereafter, the elution tests on the respective composite films were conducted. The results are shown in TABLE 2.

Production of Composite Film

A three-layered composite film of a polyethylene terephthalate film (12 μm in thickness)/an aluminum foil (9 μm in thickness)/an unextended polypropylene film (70 μm in thickness, as subjected to corona discharge treatment) was produced by the following method.

The laminate adhesives of Examples and Comparative Examples cited in TABLE 1 were applied onto an aluminum surface of the two-layered composite film made by adhesive bonding the polyethylene terephthalate film and the aluminum foil in advance. The spread of the adhesives was 2.5 g/m² by weight of a solid content of the adhesive per unit area by use of a dry laminator or a solvent-free type laminator. Then, the adhering surface was adhesive bonded with the unextended polypropylene film. Thereafter, the bonded films were cured at 50° C. for 3 days, for the curing of the adhesives.

Elution Tests

A bag was made from each of the composite films thus produced and then ion-exchange distilled water was filled in the bag as the content by the amount of 0.5 mL/cm² per unit area of the interior surface of the bag. After the bag was sterilized by heated water under the pressure of $19.6 \times 10^4$ Pa at 120° C. for 30 minutes, the contained water was extracted in the solid phase modified with an octadecyl group. Then, samples were drawn from the extracts which were dissolved in methanol of one hundredth of the quantity of original water. The samples were measured by the gas chromatography (flame ionization detector) and observed on the presence of the cyclic ester compounds and the cyclic urethane compounds. When the eluting substance was observed, the structure of the eluting substance was analyzed by use of a gas chromatograph mass spectrograph. The detection limit of the gas chromatograph (flame ionization detector) for the methanol solution of dibutyl phthalate was 50 ppb which was equivalent to 0.5 ppb in terms of the concentration of the cyclic ester compounds and cyclic urethane compounds in the extracted water in the elution tests.

TABLE 1

| Laminate adhesive | Polyol | | | | | | | | | Polyisocyanate | |
|---|---|---|---|---|---|---|---|---|---|---|---|
| | A | B | C | D | E | F | G | H | I | A | B |
| Example 1 | 100 | | | | | | | | | | 6 |
| Example 2 | | 100 | | | | | | | | 10 | |
| Example 3 | | | 100 | | | | | | | 10 | |
| Example 4 | | | | | | 100 | | | | | 40 |
| Example 5 | | | | | | | 100 | | | 10 | |
| Example 6 | | | | | | | | 100 | | 10 | |
| Example 7 | | | | | | | | | 100 | 10 | |
| Compara. Ex. 1 | | | | 100 | | | | | | | 6 |
| Compara. Ex. 2 | | | | | 100 | | | | | 10 | |

TABLE 2

| Adhesive No. | | Presence of cyclic ester compound eluted | Structure of cyclic ester compound observed | Presence of cyclic urethane compound eluted |
|---|---|---|---|---|
| Examples | 1 | Without | | Without |
| | 2 | Without | | Without |
| | 3 | Without | | Without |
| | 4 | Without | | Without |
| | 5 | Without | | Without |
| | 6 | Without | | Without |
| | 7 | Without | | Without |
| Comparative Examples | 1 | With | TPA/TPA/PG/MPD, TPA/TPA/MPD/MPD | Without |
| | 2 | With | IPA/IPA/EG/EG, IPA/IPA/EG/NPG, IPA/IPA/NPG/NPG | Without |

Abbreviations in TABLE are as follows.
IPA: Isophthalic acid,
TPA: Terephthalic acid
PG: Propylene glycol,
MPD: 3-methyl-1,5-pentandiol,
EG: Ethylene glycol,
NPG: Neopentyl glycol While the illustrative embodiments and examples of the present invention are provided in the description above, such is for illustrative purpose only and it is not to be construed restrictively. Modification and variation of the present invention that will be obvious to those skilled in the art is to be covered in the following claims.

What is claimed is:

1. A laminate adhesive, consisting essentially of a polyisocyanate component and a polyol component consisting essentially of polyester polyol,
    wherein the polyester polyol consists essentially of an acid component and a polyhydric alcohol component, the acid component consisting of naphthalenedicarboxylic acid, and optionally a dimer acid and/or phthalic acid;
    wherein the laminate adhesive satisfies the following requirement:
    when a composite film is produced by coating opposed first and second surfaces of an aluminum foil having a thickness of 9 μm with the laminate adhesive in an amount of 2.5 g/m$^2$ by weight of a solid content of the adhesive per unit area by use of a dry laminator or a solvent-free laminator, by adhering a polyethylene terephthalate film having a thickness of 12 μm to the first surface of the aluminum foil and an unextended polypropylene film having a thickness of 70 μm to the second surface, and by curing the adhered films at 50° C. for 3 days, to produce the composite film; and
    when cyclic ester compounds eluted from the laminate adhesive are measured by forming a bag from the composite film, filling the bag with ion-exchange distilled water in an amount of 0.5 mL/cm$^2$ per unit area of the interior surface of the bag, sterilizing the bag by heated water under a pressure of $19.6 \times 10^4$ Pa at 120° C. for 30 minutes, extracting the water contained in the bag in a solid phase modified with an octadecyl group, drawing a sample from the extract, dissolving the sample in methanol in an amount of one hundredth of the original amount of water contained in the bag, and measuring the presence of cyclic ester compounds in the sample by gas chromatography-flame ionization,
    wherein the cyclic ester compounds are present at a concentration of 0.5 ppb or less per 0.5 mL/cm$^2$ of the composite film, as determined by gas chromatograph-flame ionization using dibutyl phthalate as a reference compound.

2. The laminate adhesive according to claim 1, wherein the polyhydric alcohol component comprises ethylene glycol and/or propylene glycol.

3. The laminate adhesive according to claim 1, wherein cyclic urethane compounds extracted from a volume of water, and eluted from the laminate adhesive through a composite film bonded with the laminate adhesive into the volume of water, where the volume of water is equivalent to 0.5 mL/cm$^2$ of the composite film, are present at a concentration of 0.5 ppb or less per 0.5 mL/cm$^2$ of the composite film, as determined by gas chromatograph-flame ionization using dibutyl phthalate as a reference compound.

* * * * *